F. GOTTSCHALK.
INTERCHANGEABLE TRANSMITTER CASING.
APPLICATION FILED MAR. 31, 1916.

1,300,721. Patented Apr. 15, 1919.

INVENTOR
Felix Gottschalk

BY

Attorney

UNITED STATES PATENT OFFICE.

FELIX GOTTSCHALK, OF HILTON, NEW JERSEY.

INTERCHANGEABLE TRANSMITTER-CASING.

1,300,721.  Specification of Letters Patent.  Patented Apr. 15, 1919.

Application filed March 31, 1916. Serial No. 87,968.

*To all whom it may concern:*

Be it known that I, FELIX GOTTSCHALK, a citizen of the United States, residing at Hilton, in the county of Essex and State of New Jersey, have invented certain new and useful Improvements in Interchangeable Transmitter-Casings, of which the following is a specification, reference being had to the accompanying drawing.

My invention relates to interchangeable casings for mechanical vibration transmitters.

In an electrical apparatus for detecting mechanical vibrations comprising a transmitter, receiver, battery and suitable connections as described in the patent issued to me April 27, 1915, and numbered 1137478, the transmitter is inclosed within a casing which insulates it from external sounds that might reach it through the air, this adapts the transmitter to the reception and transmission of mechanical vibrations only.

A device of this character is used in testing machinery and other apparatus for defects, and for locating "knocks," and when so used I find that difficulty is experienced in placing the transmitter casing in direct contact with the part to be tested, which is often inaccessible.

The object of the present invention is to provide a supplemental casing which can be easily slipped over the regular transmitter casing, said supplemental casing having a suitable projecting finger adapted to reach into ordinarily inaccessible places and make contact with the part to be tested.

A further object is to arrange said supplemental casing so that interchangeable fingers of various shapes may be employed. I find that by the use of suitably shaped fingers brought directly in contact with the part to be tested, that the "knock" or other sound is considerably amplified and may be definitely traced and the defective part thereby accurately located.

Figure 1:
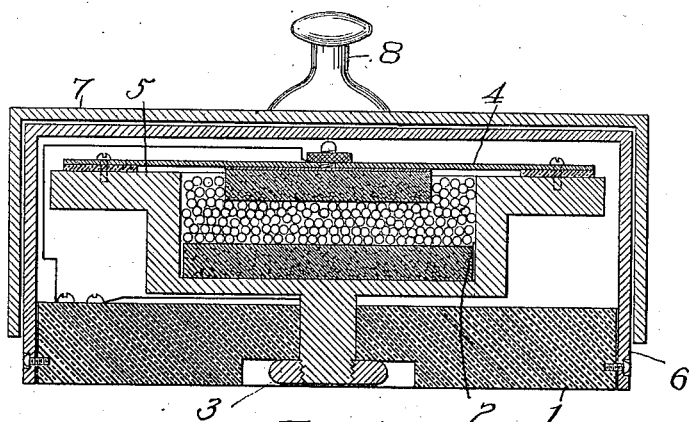
Figure 2:
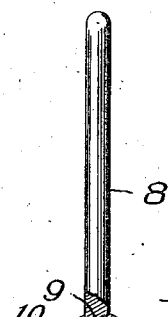
Figure 3:

In the accompanying drawings Figure 1 shows a transmitter partly in section to illustrate my invention, while Figs. 2 and 3 are the supplemental casings therefor. Like figures of reference denote the same parts wherever they are shown.

1 denotes the rear casing or back supporting the cell indicated at 2 comprising a pair of electrodes and a variable resistance medium. The back electrode and cell casing 5 are secured to the rear casing 1 by the nut 3. The vibratory member 4 is connected to the front electrode and serves to close the cell in any well known manner and is peripherally supported on the cell casing 5. This structure can be varied within wide limits and may consist of the arrangement shown and described in the patent granted to me April 27, 1915, and numbered 1137479.

The ordinary outer casing 6 of the transmitter usually completely surrounds and incloses the working parts of the transmitter, and the present invention consists of the supplemental casing 7 which slips freely over the ordinary casing 6 and carries a suitable projecting finger 8. Figs. 2 and 3 illustrate fingers of different sizes adapted for different purposes. It will be noted that the inner end 9 of these may be threaded to engage the nut 10 rigidly attached to the vibratory surface of the supplemental casing 7.

I claim:

In an apparatus of the character described, an electric transmitter having a casing, a supplemental casing therefor, and fingers of different shapes, and means whereby any one of them may be detachably secured to said supplemental casing.

In testimony whereof I hereunto affix my signature in the presence of two witnesses.

FELIX GOTTSCHALK.

Witnesses:
SAML. B. WELLINGTON,
EDMUND R. DODGE.